US012210320B2

(12) United States Patent
Zhang

(10) Patent No.: US 12,210,320 B2
(45) Date of Patent: Jan. 28, 2025

(54) WATCH WITH CASE CONVENIENT TO REPLACE

(71) Applicant: Shenzhen CIGA Design Co., Ltd., Shenzhen (CN)

(72) Inventor: Jianmin Zhang, Shenzhen (CN)

(73) Assignee: Shenzhen CIGA Design Co., Ltd., Shenzhen (CN)

( * ) Notice: Subject to any disclaimer, the term of this patent is extended or adjusted under 35 U.S.C. 154(b) by 358 days.

(21) Appl. No.: 17/869,729

(22) Filed: Jul. 20, 2022

(65) Prior Publication Data

US 2023/0026580 A1 Jan. 26, 2023

(30) Foreign Application Priority Data

Jul. 21, 2021 (CN) ......................... 202121665620.9

(51) Int. Cl.
*G04B 37/00* (2006.01)
*G04B 37/14* (2006.01)

(52) U.S. Cl.
CPC ........... *G04B 37/005* (2013.01); *G04B 37/14* (2013.01)

(58) Field of Classification Search
CPC .. G04B 37/005; G04B 37/14; G04B 45/0092; G04B 47/046; G04B 3/041; G04B 37/0008; G04B 37/0041
See application file for complete search history.

(56) References Cited

U.S. PATENT DOCUMENTS

| | | | | |
|---|---|---|---|---|
| 8,790,004 | B2 * | 7/2014 | Chatelain | G04B 37/0008 368/282 |
| 10,606,216 | B2 * | 3/2020 | Dubois | G04B 37/14 |
| 11,036,187 | B2 * | 6/2021 | Iguchi | G04B 37/086 |
| 11,650,547 | B2 * | 5/2023 | Tschumi | A44C 5/147 368/291 |

FOREIGN PATENT DOCUMENTS

| | | |
|---|---|---|
| CN | 203673234 U | 6/2014 |
| CN | 110275422 A | 9/2019 |
| CN | 209373354 U | 9/2019 |

* cited by examiner

*Primary Examiner* — Edwin A. Leon
(74) *Attorney, Agent, or Firm* — Nitin Kaushik

(57) ABSTRACT

A watch includes a case, a movement and an inner container. The movement is disposed on the inner container. The watch further includes an engagement structure for assembling the case and the inner container. The engagement structure includes an elastic component and an engagement block used for fixing the elastic component. The engagement block is fixed to the inner container. The elastic component includes a buckle and an elastic element. The buckle is provided with a buckle hole. One part of the elastic element is disposed in the buckle hole, and another part of the elastic element is in elastic contact with the inner container.

9 Claims, 4 Drawing Sheets

WATCH WITH CASE CONVENIENT TO REPLACE

CROSS-REFERENCE TO RELATED APPLICATIONS

The application claims priority to Chinese patent application No. 202121665620.9, filed on Jul. 21, 2021, the entire contents of which are incorporated herein by reference.

TECHNICAL FIELD

The present disclosure relates to the technical field of watches, in particular to a watch with a case convenient to replace.

BACKGROUND

A watch, which is also known as a wristwatch, refers to an instrument worn on the wrist and used for displaying time. At present, a watch has gradually become an ornament in the life of people, a consumer who ardently loves watches likes watches with different colors and styles to purchase different watches, but the consumer has to spend a lot of money; and meanwhile, in order to be matched with the overall dressing style, people generally need to replace a watch with a different color or style for matching, however, the consumer has to purchase various different watches, which will bring unwanted waste for the consumer.

Therefore, the prior art still needs to be improved.

SUMMARY

In view of the above-mentioned defects in the prior art, the purpose of the present disclosure is to provide a watch with a case convenient to replace, which adopts a case and an inner container which are separately disposed so that a user can arbitrarily replace the case or inner container to meet different demands.

In order to achieve the above-mentioned purpose, the present disclosure adopts the following technical solutions:

A watch with a case convenient to replace, comprising a case, a movement and an inner container, the movement being disposed on the inner container, wherein the watch further comprises an engagement structure for assembling the case and the inner container; one part of the engagement structure is disposed on the inner container, and the other part of the engagement structure is engaged with the case and is in elastic contact with the inner container; when the case is dismounted, the engagement structure is pressed to be elastically compressed towards one side of the inner container so as to be disengaged from the case; and when the case is mounted, an outer side of the inner container is sleeved by the case, and the case is pressed along a side wall of the engagement structure, so that the engagement structure is engaged with the case.

Further, wherein the engagement structure comprises an elastic component and an engagement block used for fixing the elastic component, the engagement block is fixed to the inner container, the elastic component comprises a buckle and an elastic element, the buckle is provided with a buckle hole, one part of the elastic element is disposed in the buckle hole, and the other part of the elastic element is in elastic contact with the inner container.

Further, wherein the engagement block is provided with a gap for disposing the buckle, and a limiting part abutted with the buckle is disposed on a side of the gap.

Further, wherein the buckle hole is a blind hole.

Further, wherein the elastic element is a spring, and at least one spring is provided.

Further, wherein the buckle is provided with a boss, an engagement groove engaged with the boss is disposed in an inner wall of the case.

Further, wherein the buckle is provided with an inclined surface facilitating the engagement of the case.

Further, wherein the engagement block is fixed to the outer side of the inner container by using a screw.

Further, wherein positioning protrusions are disposed on the side wall of the engagement block, and positioning parts matched with the positioning protrusions are disposed on the inner wall of the case.

Further, wherein a positioning groove for accommodating the buckle and the engagement block is disposed in a side of the inner container.

Compared with the prior art, the present disclosure provides a watch with a case convenient to replace, including a case, a movement and an inner container, wherein the movement is disposed on the inner container. The watch further includes an engagement structure for assembling the case and the inner container; one part of the engagement structure is disposed on the inner container, and the other part of the engagement structure is engaged with the case and is in elastic contact with the inner container; when the case is dismounted, the engagement structure is pressed to be elastically compressed towards one side of the inner container so as to be disengaged from the case; and when the case is mounted, an outer side of the inner container is sleeved by the case, and the case is pressed along a side wall of the engagement structure, so that the engagement structure is engaged with the case. According to the present disclosure, by pressing the engagement structure, the case may be detached from the inner container; and by sleeving the case on the outer side of the inner container and pressing the case along the side wall of the engagement structure, the case may be engaged with the inner container. The watch is simple in structure and convenient to operate, so that a user can select the proper case and inner container to be matched and combined according to different demands on different occasions, and then, waste caused by purchasing different watches is avoided.

DETAILED DESCRIPTION OF THE EMBODIMENTS

Figure 1:
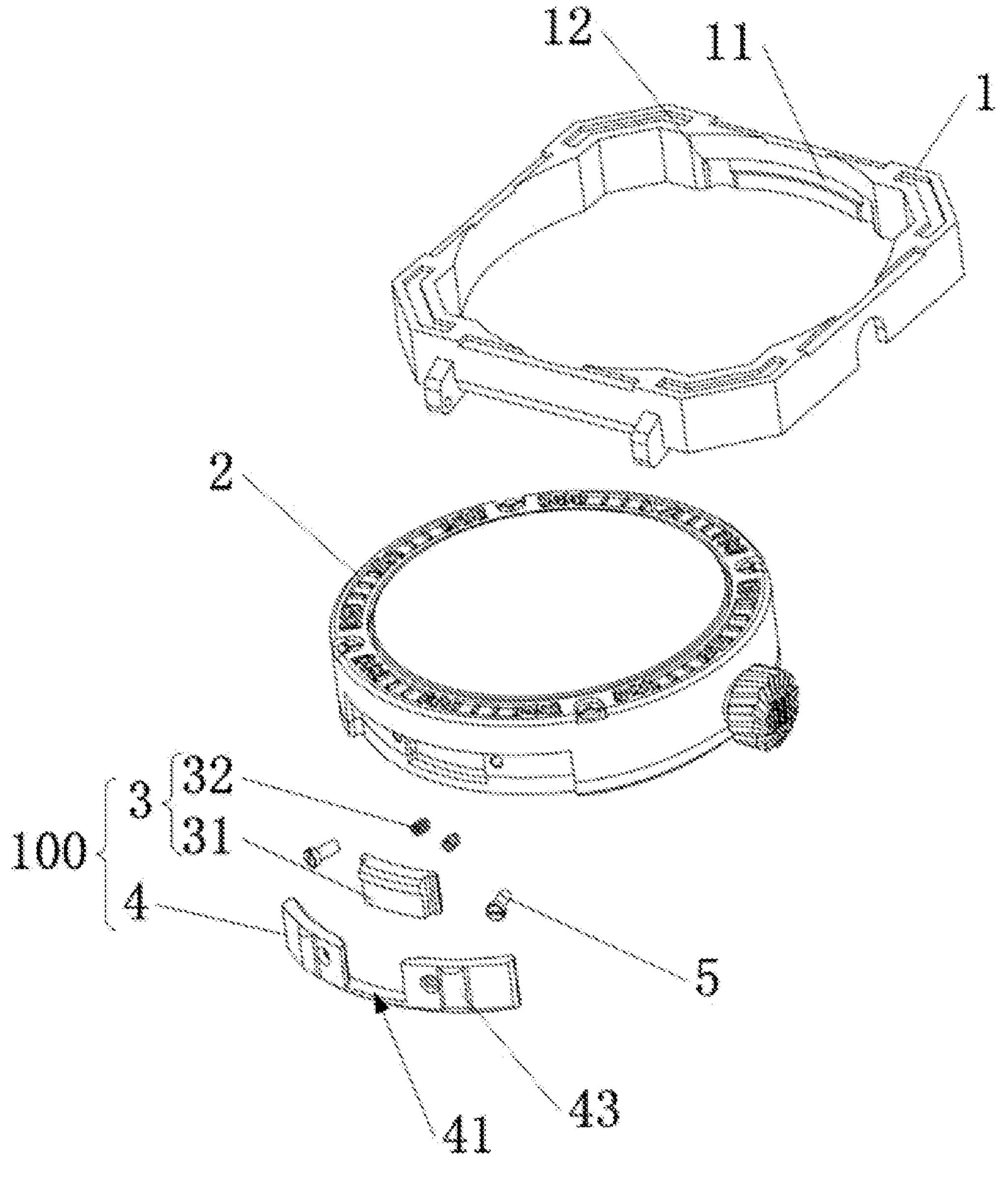
FIG. 1 is a schematic view of a breakdown structure of a watch with a case convenient to replace provided in the present disclosure.
Figure 2:
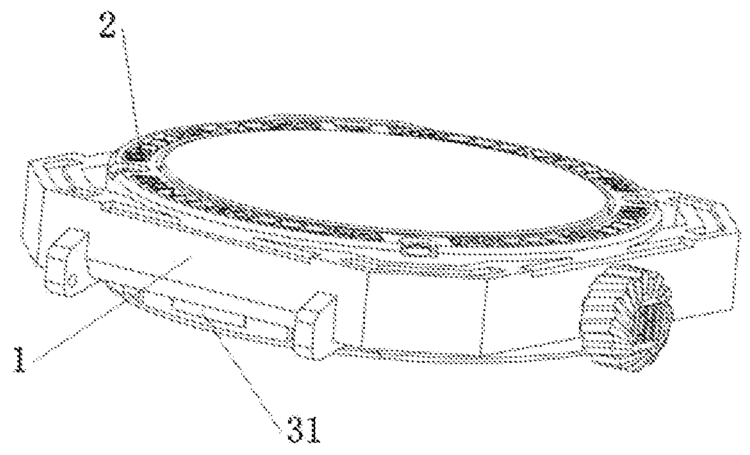
FIG. 2 is a schematic view of an assembly structure of the watch with the case convenient to replace provided in the present disclosure.
Figure 3:
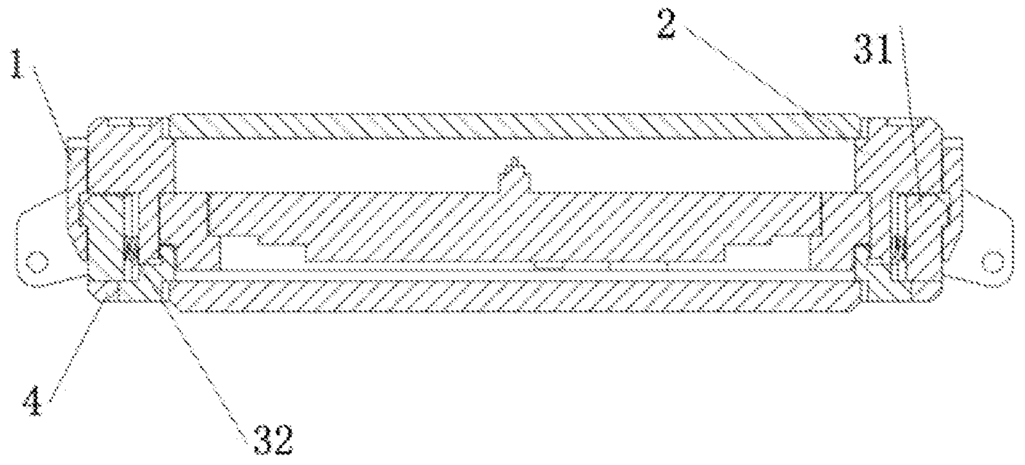
FIG. 3 is a sectional view of the watch with the case convenient to replace provided in the present disclosure.
Figure 4:
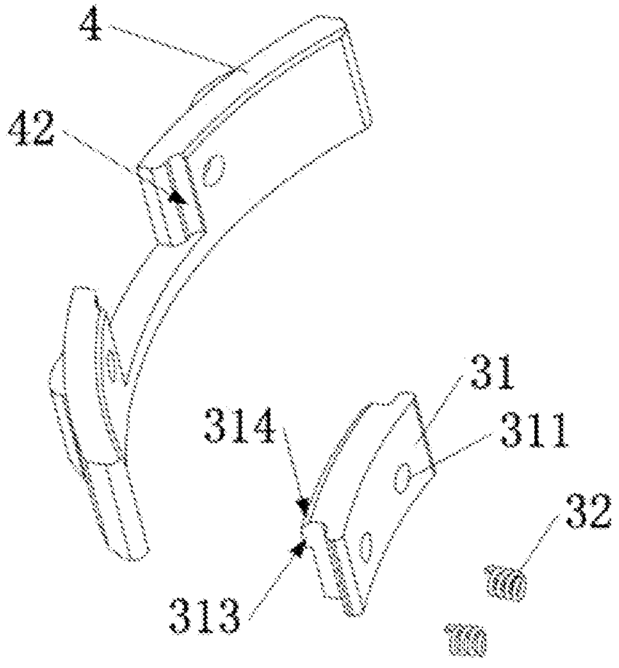
FIG. 4 is a schematic view of a breakdown structure of an engagement structure provided in the present disclosure.

The present disclosure provides a watch with a case convenient to replace. With reference to FIG. 1 to FIG. 4, the watch includes a case 1, a movement (not shown in the figures) and an inner container 2, wherein the movement 1 is disposed on the inner container 2. The watch further includes an engagement structure 100 for assembling the case 1 and the inner container 2; one part of the engagement structure 100 is disposed on the inner container 2, and the other part of the engagement structure 100 is engaged with the case 1 and is in elastic contact with the inner container 2; when the case 1 is dismounted, the engagement structure 100 is pressed to be elastically compressed towards one side of the inner container 2 so as to be disengaged from the case 1; and when the case 1 is mounted, an outer side of the inner container 2 is sleeved by the case 1, and the case 1 is pressed along a side wall of the engagement structure 100, so that the engagement structure 100 is engaged with the case 1. According to the present disclosure, by pressing the engagement structure 100, the case 1 may be detached from the inner container 2; and by sleeving the case 1 on the outer side of the inner container 2 and pressing the case 1 along the side wall of the engagement structure 100, the case 1 may be engaged with the inner container 2. The watch is simple in structure and convenient to operate, so that a user can select the proper case 1 and inner container 2 to be matched and combined according to different demands on different occasions, and then, waste caused by purchasing different watches is avoided. In the present disclosure, the case 1 refers to a shell of the watch.

As an embodiment of the present disclosure, the engagement structure 100 includes an elastic component 3 and an engagement block 4 used for fixing the elastic component 3, the engagement block 4 is fixed to the inner container 2, the elastic component 3 includes a buckle 31 and an elastic element 32, the buckle 31 is provided with a buckle hole 311, one part of the elastic element 32 is disposed in the buckle hole 311, and the other part of the elastic element 32 is in elastic contact with the inner container 2. The buckle hole 311 is a blind hole, one end of the elastic element 32 is engaged inside the buckle hole 311 and is abutted with an inner wall of the buckle hole 311, and the other end of the elastic element 32 is in elastic contact with the side wall of the inner container 2. The elastic element 32 is a spring, and at least one spring is provided. In the embodiment of the present disclosure, two springs are provided. The buckle hole 311 is located in a lower position at the inner side of the buckle 31 to avoid the phenomenon that the case cannot be normally dismounted due to the shielding of a position that is pressed by a hand of a person after the case is mounted.

As an embodiment of the present disclosure, the engagement block 4 is provided with a gap 41 for disposing the buckle 31, and a limiting part 42 abutted with the buckle 31 is disposed on a side of the gap 41. The engagement block 4 is fixed to the outer side of the inner container 2 by using a screw 5, the screw 5 is a countersunk head screw, the engagement block 4 is provided with a countersunk head hole (not shown in the figures), and adopting other screws to affect the engagement between the case 1 and the inner container 2 is avoided. The buckle 31 is provided with a boss 313, an engagement groove 11 engaged with the boss 313 is disposed in the inner wall of the case 1. When the engagement block 4 and the buckle 31 are assembled, the limiting part 42 on the engagement block 4 is abutted with the left and right ends of the buckle 31, the engagement block 4 is fixed to the inner container 2 by using the screw 5, and then, the buckle 31 is disposed in the gap 41 of the engagement block 4. After the engagement block 4 and the buckle 31 are disposed and fixed, the thickness of the boss 313 protruding out of the outer side is higher than the outer surface of the engagement block 4, the boss 313 is shaped like an arc-shaped strip, the corresponding engagement groove 11 shaped like the arc-shaped strip is disposed in the inner wall of the case 1, and the boss 313 on the buckle 31 is engaged inside the engagement groove 11. A positioning groove (not shown in the figures) for accommodating the buckle 31 and the engagement block 4 is disposed in a side of the inner container 2. By disposing the positioning groove, the phenomenon that the buckle 31 and the engagement block 4 slide left and right to affect the engagement stability in a process that the case 1 and the inner container 2 are engaged and fixed is avoided.

As an embodiment of the present disclosure, the buckle 31 is provided with an inclined surface 314 facilitating the engagement of the case 1, and the inclined surface 314 is located on a side of the boss 313. When the case 1 is engaged with the inner container 2, the inner side of the case 1 squeezes the elastic component 3 along the inclined surface 314, thereby engaging the boss 313 inside the engagement groove 11. Due to the existence of the inclined surface 314, the case 1 and the inner container 2 are engaged more conveniently.

As an embodiment of the present disclosure, positioning protrusions 43 are disposed on the side wall of the engagement block 4, and positioning parts 12 matched with the positioning protrusions 43 are disposed on the inner wall of the case 1. Two positioning protrusions 43 are provided and are arc-shaped protrusions. Due to the disposing of the positioning protrusions 43, a guide effect is achieved in a mounting process of the case, a relative sliding situation is avoided in the process that the case 1 is engaged with the inner container 2, and the engagement between the case 1 and the inner container 2 is greatly facilitated; and meanwhile, due to the disposing of the positioning parts 12, the depth of engagement between the case 1 and the inner container 2 is also limited, and excessive engagement is avoided.

In conclusion, the present disclosure provides a watch with a case convenient to replace, including a case, a movement and an inner container, wherein the movement is disposed on the inner container. The watch further includes an engagement structure for assembling the case and the inner container; one part of the engagement structure is disposed on the inner container, and the other part of the engagement structure is engaged with the case and is in elastic contact with the inner container; when the case is dismounted, the engagement structure is pressed to be elastically compressed towards one side of the inner container so as to be disengaged from the case; and when the case is mounted, the outer side of the inner container is sleeved by the case, and the case is pressed along a side wall of the engagement structure, so that the engagement structure is engaged with the case. According to the present disclosure, by pressing the engagement structure, the case may be detached from the inner container; and by sleeving the case on the outer side of the inner ID container and pressing the case along the side wall of the engagement structure, the case may be engaged with the inner container. The watch is simple in structure and convenient to operate, so that a user can select the proper case and inner container to be matched and combined according to different demands on different occasions, and then, waste caused by purchasing different watches is avoided.

What is claimed is:

1. A watch, comprising a case, a movement and an inner container, the movement being disposed on the inner container, wherein the watch further comprises an engagement structure for assembling the case and the inner container; one part of the engagement structure is disposed on the inner container, and another part of the engagement structure is engaged with the case and is in elastic contact with the inner container; when the case is dismounted, the engagement structure is pressed to be elastically compressed towards one side of the inner container so as to be disengaged from the case; and when the case is mounted, an outer side of the inner container is sleeved by the case, and the case is pressed along a side wall of the engagement structure, so that the engagement structure is engaged with the case, wherein the engagement structure comprises an elastic component and an engagement block used for fixing the elastic component, the engagement block is fixed to the inner container, the elastic component comprises a buckle and an elastic element, the buckle is provided with a buckle hole, one part of the elastic element is disposed in the buckle hole, and another part of the elastic element is in elastic contact with the inner container.

2. The watch of claim 1, wherein the engagement block is provided with a gap for disposing the buckle, and a limiting part abutted with the buckle is disposed on a side of the gap.

3. The watch of claim 1, wherein the buckle hole is a blind hole.

4. The watch of claim 3, wherein the elastic element comprises at least one spring.

5. The watch of claim 1, wherein the buckle is provided with a boss, an engagement groove engaged with the boss is disposed in an inner wall of the case.

6. The watch of claim 5, wherein the buckle is provided with an inclined surface facilitating the engagement of the case.

7. The watch of claim 1, wherein the engagement block is fixed to the outer side of the inner container by using a screw.

8. The watch of claim 1, wherein positioning protrusions are disposed on the side wall of the engagement block, and positioning parts matched with the positioning protrusions are disposed on the inner wall of the case.

9. The watch of claim 8, wherein a positioning groove for accommodating the buckle and the engagement block is disposed in a side of the inner container.

* * * * *